United States Patent [19]

Katayama et al.

[11] 3,800,006

[45] Mar. 26, 1974

[54] GRAFT POLYMERS FROM VINYL COMPOUNDS WITH BETA-PROPIOLACTONE, EPSILON-CAPROLACTONE AND ETHYLENE OXIDE

[75] Inventors: Shitomi Katayama; Hideichi Horikawa, both of Tokyo; Yukio Takahashi, Akita; Noboru Masuda, Tokyo, all of Japan

[73] Assignee: Denki Onkyo Co., Ltd., Tokyo, Japan

[22] Filed: Apr. 7, 1972

[21] Appl. No.: 242,205

Related U.S. Application Data

[63] Continuation of Ser. No. 807,999, March 17, 1969.

[30] Foreign Application Priority Data

May 25, 1968  Japan.............................. 43-35325

[52] U.S. Cl................ 260/874, 260/32.6, 260/887, 260/898, 260/899, 260/901
[51] Int. Cl..... C08f 29/50, C08f 29/56, C08f 29/24
[58] Field of Search ........... 260/874, 887, 898, 899, 260/901

[56] References Cited

UNITED STATES PATENTS

| | | | |
|---|---|---|---|
| 3,379,794 | 4/1968 | King et al. | 260/898 |
| 3,021,310 | 2/1962 | Cox et al. | 260/78.3 |
| 3,562,360 | 2/1971 | King et al. | 260/898 |

*Primary Examiner*—Murray Tillman
*Assistant Examiner*—C. J. Seccuro
*Attorney, Agent, or Firm*—Toren & McGeady

[57] ABSTRACT

A process of preparing graft polymers with graft chains consisting of ring-opened units of at least one of the cyclic monomers $\beta$-propiolactone, $\epsilon$-caprolactone, and ethylene oxide which comprises reacting said cyclic monomers with homopolymers or copolymers consisting of vinyl units containing carboxylate ions —COO$^-$. The invention also relates to the graft polymers so prepared. These graft polymers are colorless, easy to dye, have a high degree of plasticity, and low tendency to develop electrostatic charge. Depending on the graft ratio, which may be controlled, materials useful as adhesives, gums and paints may be produced having high graft ratios, while materials with low graft ratios are used for fibers, plastics and films.

6 Claims, No Drawings

GRAFT POLYMERS FROM VINYL COMPOUNDS WITH BETA-PROPIOLACTONE, EPSILON-CAPROLACTONE AND ETHYLENE OXIDE

This is a continuation of application Ser. No. 807,999, filed on March 17, 1969.

SUMMARY OF THE INVENTION

The present invention relates to new synthetic graft polymers and a process for their preparation. More specifically, the invention concerns the preparation of graft polymers starting from vinyl monomers, subjecting them to polymerization, and combining them with one or several ring-opened cyclic monomers of the group $\beta$ - propiolactone, $\epsilon$ - caprolactone and ethylene oxide.

In the industry concerned with the preparation of polymers, it has become a serious problem that most of the products have a tendency of developing electrostatic charge. This inconvenience is particularly experienced in the commercially available fibers, films and other processed or unprocessed polymers. It is another shortcoming of synthetic fibers that they lack in moisture absorbing properties and do not feed natural to the touch.

Some methods of graft polymerization have already been tried in order to overcome the disadvantages outlined above. Thus, graft polymerization of ethylene oxide and $\beta$ - propiolactone have been attempted to combine them with hydroxyl or amide groups as well as double linkages in polymers. However, so far the attempts have not been successful for the reasons explained below.

1. The introduction of hydroxyl groups to addition polymers has been done mainly by the copolymerization of vinyl monomers with vinyl acetate followed by the hydrolysis of the resulting copolymers. By this method, however, the copolymers from acrylonitrile, vinyl chloride, acrylamide, etc. with hydrolytic functional groups show a tendency to decompose.

There is another method known of copolymerizing allyl alcohol with vinyl monomers to introduce hydroxyl groups in polymers.

This method, however, results in polymers of a low degree of polymerization and poor yields, thereby incurring economical losses and deterioration of mechanical properties of the polymers.

2. In order to introduce amide groups to addition polymers, the copolymerizations of monomers having either primary or secondary amide groups, such as acrylamide or methacrylamide, have been tried. These amide groups often give rise to cyclization and cross-linking reactions, gelating and degenerating the copolymers.

There are some studies on the graft polymerization of ethylene oxide and $\beta$ - propiolactone to polyamide obtained by polycondensation, but such severe reaction conditions as high temperature are needed for the cyclic monomers to react with the secondary amide groups along the main molecular chain, that some side reactions like the cleavage of the chain and the coloring of polymers are involved, thus impairing the polymer properties.

3. Since hydroxyl groups and amide groups are both only slightly reactive with $\beta$ - propiolactone and ethylene oxide, the reaction conditions have to be severe and are difficult to control, the resulting graft polymers becoming of low quality with insufficient graft and substitution ratios.

It is an object of the present invention to provide graft polymers of improved properties and a method of preparing the same.

More particularly it is an object to prepare graft polymers in which the tendency to develop electrostatic charge is less pronounced, if at all present.

It is another object to prepare graft polymers which have improved moisture absorbing properties, rendering the polymers more natural to the touch and making them more satisfactory for use in wearing apparel and the like.

It is yet another object to provide a process for the preparation of graft polymers which can be carried out under mild operational conditions, thereby rendering the manufacture simpler and less expensive.

Other objects and advantages of the present invention will become apparent from the following detailed description.

Generally speaking, the invention comprises a process in which vinyl units, having incorporated therein carboxylate ions, are combined with a ring opened unit or several such units of the group of cyclic compounds consisting of $\beta$-propiolactone, $\epsilon$-caprolactone, and/or ethylene oxide.

On preparing the polymers having carboxylate ions or polymer salts, whether they are derived from homopolymers or copolymers, either direct polymerization of vinyl monomers having a carboxylate ion or polymerization of vinyl monomers having a carboxyl group followed by neutralization with bases, can be applied.

When the last mentioned method is used, the process consists of the following three steps: the first step is either to copolymerize a vinyl monomer $M_1$ with a monomer $M_2$—COOH having one or more carboxyl groups or causing the homopolymer from $M_2$—COOH to form polymers containing carboxyl groups at the molecular side chains; the second step is to change the polymers into polymer salts by treating them with organic or inorganic bases; the last step is the addition of one or several of the compounds $\beta$-propiolactone, $\epsilon$-caprolactone and ethylene oxide to the polymer salts.

The above mentioned methods of preparing the graft polymers can be illustrated by the following equations.

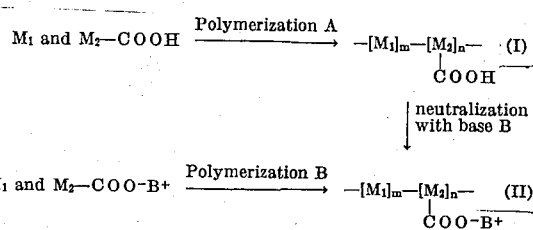

where $m$ stands for the total units of the vinyl monomer $M_1$ contained in the copolymer, and n stands for the total units of the acidic monomer $M_2$—COOH contained in the copolymer and where $0 < n/(m+n) \leq 1$, $n \neq 0$
wherein $n/(m+n)$ is the mole fraction of the acidic monomer $M_2$—COOH contained in the copolymer, and $B^+$ stands for a cation of a base.

Subsequently the grafting step is carried out:

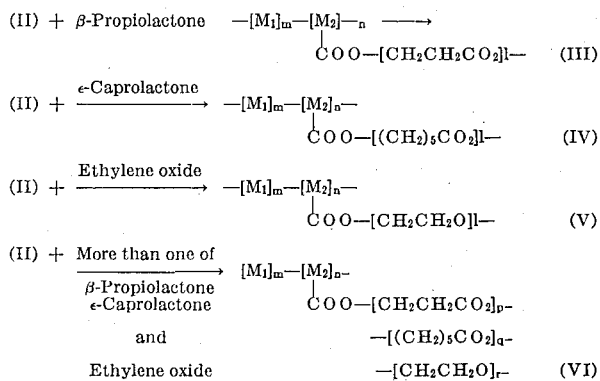

$l$, $p$, $q$ and $r$ stand for the average graft chain length (counted in monomer units) of the ring-opened cyclic monomers contained in the graft polymers.

The graft ratio Rg of the graft polymer is defined by the following equations.

Rg = $(100\ nl)/(m+n)$ for Reactions (III), (IV) and (V)

Rg = $[100n(p+q+r)]/(m+n)$ for Reaction (VI)

The polymerizations A and B can be performed by known methods.

Monomers $M_1$ are those which can copolymerize with monomers $M_2$—COOH, e.g., acrylonitrile, methacrylonitrile, acrylamide, methacrylamide, styrene, vinylacetate, vinylidene cyanide, butadiene, vinylchloride, vinylidene chloride, methyl acrylate, methyl methacrylate.

Examples of the monomers $M_2$—COOH are:

acrylic acid, methacrylic acid, crotonic acid, maleic acid, aconitic acid, itaconic acid, α-oleostearic acid, their anhydrides, acid chlorides and their esters.

Examples of the bases B used to treat the polymer acids are:

hydroxides of alkali metals, such as lithium hydroxide, sodium hydroxide, potassium hydroxide, or their hydrogen carbonate; ammonia; alkyl amines, e.g. dimethyl-amine, trimethylamine, ethylamine, diethylamine, propylamine, butylamine; aromatic amines e.g., aniline, pyridine, pyrrole; and other inorganic and organic bases that can form ionic salts with carboxyl groups.

In the above mentioned process, the first step can be performed easily by the well known methods of addition polymerization, forming polymers of high degrees of polymerization and high yields.

For example, to improve the properties of polymers from acrylonitrile, styrene, vinyl chloride or butadiene, the copolymers as materials for the graft polymers can easily be prepared by only adding a small suitable amount of $M_2$—COOH monomers, such as acrylic acid, without changing the polymerization method or plants.

By small amount, roughly 0.01 – 0.2 mole fraction is understood, in other words $n/(m+n)$ = 0.01 to 0.2.

In the second step, ammonia and liquid organic bases are the most desirable compounds to prepare homopolymer and copolymer salts.

The polymer salts can be easily prepared by adding the above bases directly to the homopolymers or copolymers. The amount of the base to be added may be either equivalent to the carboxyl groups contained in the polymer or an excess amount. In the latter case, the unreacted excess amount of the base should be removed. The separation of the base may be performed either by distillation, or vaporization, or by extraction with some solvent which dissolves only the base. On the other hand, in the case of an inorganic base which is either insoluble or difficult to dissolve in organic solvents, it may be used as an aqueous solution. Since the separation of the unreacted base is difficult in that case, it is better to use the base in the equivalent amount to the carboxyl groups. Solid organic bases may also be used in the dissolved state.

The second process mentioned above is a rather rapid reaction at any temperatures at which the base can exist in the liquid state. The time needed to make a complete polymer salt depends upon the size, form and state of the starting acidic polymer. Mainly, the dispersion of the base in the polymer may determine the rate of the reaction. Thus, when the reaction system is homogeneous, the time may be of the order of seconds or minutes, but when it is heterogeneous, hours may be necessary to complete the reaction. For these reasons, the polymers insoluble in bases or in their solutions should be used only as small particles or threads.

The above reaction can be performed in air, but carbon dioxide and moisture, which may react with the amine to form the salt, must be excluded from the system. The polymer salt obtained in the above process may contain some unreacted carboxyl groups, but it should not contain free amine, hydrogen carbonate or carbonate salt, which causes the homopolymerization of the cyclic monomers, which affect in turn the properties of the graft polymers.

In the third process the cyclic monomer is reacted with the polymer salt to form the graft polymer. The reaction may be performed with or without solvent, in an inactive atmosphere thus ensuring the absence of side reactions. At lower temperatures, dry air may be sufficient as inactive atmosphere but at higher temperatures gases like nitrogen, helium and argon are preferred. The reaction temperature may be above the melting point of the cyclic monomer and below about 160°C, but 40° – 100°C are preferred for ε-caprolactone and ethylene oxide, and 0° – 80°C are preferred for β-propiolactone.

The most important property of the solvent is that, if it is not completely inert, it should only react slightly with the cylic monomer, β-propiolactone, ε-caprolactone or ethylene oxide. Examples of suitable solvents are: chloroform, carbon tetrachloride, ethers, tetrahydrofran, dioxane, γ-butyrolactone, aliphatic and aromatic hydrocarbons, N,N-dimethylformamide, N,N-dimethylacetamide, dimethylsulfoxide, N-methylpyrrolidone, alcohols, etc. Water and alcohols are less desirable since they react with β-propiolactone and ε-caprolactone. N,N-dimethylformamide, N,N-dimethylacetamide, dimethyl-sulfoxide and N-methylpyrrolidone sometimes cause the cyclic monomers to homopolymerize, although they increase the rate of graft polymerization.

The graft polymers (obtained in the third process) may be either precipitated to form powder or made directly into film or thread.

The three processes mentioned can be easily connected to be a successive process as explained in the following example on the improvement of polyacrylonitrile.

Acrylonitrile is copolymerized with below 20 percent of acrylic acid by a conventional method, e.g. polymerizing in dimethylsulfoxide with $\alpha,\alpha'$-azobisisobutyronitrile at 50°C for 40 hrs. The resulting polymer solution can form fibers by the usual wet spinning. During or after this spinning, the fiber should be passed through an amine, e.g., ethylamine or its solution in some solvent. As ethylamine is very volatile, it can be easily removed from the fiber of the copolymer salt. The fiber is then passed through the solution containing $\beta$-propiolactone, to yield the fiber of the graft polymer.

The following examples will serve to illustrate our invention further.

EXAMPLE 1

Into a round bottom flask equipped with two condensers and a stirrer, acrylonitrile and acrylic acid were introduced together with 300 ml of water. The amounts of the monomers are shown in Table 1. 0.6 g of potassium persulfate dissolved in 10 ml of water was added to the mixture with stirring at 40°C, followed by further adding of 0.3 g of sodium bisulfite dissolved in 10 ml of water 1 min. later; the polymerization was continued for 20 hrs.

White powder was obtained which was washed with 500 ml of water in a high-speed mixer, filtered and dried in vacuo.

40 g of the copolymer powder and 600 ml of n-butylamine were placed in a nitrogen atmosphere in an ampoule which was sealed and maintained standing at 30°C for 20 hrs. After 20 hrs. the content was washed with n-hexane to remove free amine, and the resulting copolymer salt was dried in vacuo. The conversion to the copolymer salt was almost 100 percent.

40 g of the copolymer salt and 600 ml of $\beta$-propiolactone were placed in a nitrogen atmosphere in an ampoule which was sealed and kept at 30°C for 20 hrs. The contents, becoming almost homogeneous, were poured into 6 l of vigorously agitated chloroform in a high-speed mixer to form a powder which was filtered and dried in vacuo. Properties of the copolymer, copolymer salt and graft polymer are given in Table 1.

oid nicols. $[\eta]$ is the intrinsic viscosity measured in N,N-dimethylformamide at 30°C. The relative crystallite size t (A) was obtained using Sherrer's equation without correction, $t = (0.9\lambda)/(\beta COO\theta)$. The relative crystallinity is the percent integral intensity of the crystalline X-ray peak of the polymer.

The results in Table 1 show that the crystallite size and crystallinity of the graft polymer are typically smaller than those of the copolymer and copolymer salt, rendering the polymer more plastic and decreasing the volume (inherent electric) resistivity to $1 \times 10^{12} - 1 \times 10^6$ $\Omega$/cm, which benefits the graft polymer in its dyeability, resistance to electrostatic charge and resistance against scratching.

EXAMPLE 2

2.65 g of the copolymer salt obtained in Example 1 and $\beta$-propiolactone dissolved in 50 ml of chloroform were placed in a nitrogen atmosphere in an ampoule which was sealed and kept standing at 30°C for 20 hrs. The resulting graft polymer was treated by the same method as described in Example 1. The properties of the graft polymers are given in Table 2. The graft ratio and graft chain length of the graft polymer in this example are smaller than those in Example 1.

TABLE 2

| Experimental Data No. | $\beta$-Propio lactone (g.) | Graft ratio | Graft chain length | Melting point °C. |
|---|---|---|---|---|
| 2-1 | 10 | 13.5 | 1.30 | 185~194 |
| 2-2 | 3.6 | 8.87 | 0.854 | 193~201 |
| 2-3 | 1.0 | 5.26 | 0.506 | 197~206 |
| 2-4 | 0.10 | 0.80 | 0.101 | 205~212 |

EXAMPLE 3

2.65 g of the copolymer salt obtained by experimental data No. 1-3 of Example 1 and $\beta$-propiolactone dissolved in 50 ml of N,N-dimethylformamide were sealed in an ampoule in a nitrogen atmosphere and maintained at 30°C for 20 hrs. The contents were then poured into 500 ml of vigorously agitated water in a high-speed mixer to yield white powder which was washed with methanol, filtered and dried in vacuo.

The properties of the resulting graft polymers are given in Table 3. The graft ratio and graft chain length of the graft polymer are larger than those in Example 1.

TABLE 3

| Experimental Data No. | $\beta$-Propio lactone (g.) | Graft ratio | Graft chain length | Melting point °C | $[\eta]$ |
|---|---|---|---|---|---|
| 3-1 | 10 | 59.2 | 5.69 | 168~172 | 4.50 |
| 3-2 | 3.6 | 38.9 | 3.74 | 173~177 | 4.20 |
| 3-3 | 1.0 | 25.2 | 2.43 | 174~180 | 4.05 |
| 3-4 | 0.10 | 12.7 | 1.28 | 186~192 | 3.90 |

TABLE 1

| Experimental data number | Copolymer | | | | Copolymer salt, M.P. | Graft ratio | Graft chain length | Graft polymer | | | |
|---|---|---|---|---|---|---|---|---|---|---|---|
| | $f_2$ | $F_2$ | M.P. | $[\eta]$ | | | | M.P. | $[\eta]$ | Relative crystallinity | Relative crystallite size |
| 1-1 | 0.0100 | 0.0693 | 214~219 | 3.03 | 204~209 | 8.55 | 1.23 | 172~179 | 2.60 | 31.5 | 111 |
| 1-2 | 0.0300 | 0.0819 | 220~225 | 3.00 | 197~202 | 15.5 | 2.06 | 178~186 | 2.52 | 30.5 | 100 |
| 1-3 | 0.0500 | 0.104 | 222~226 | 3.81 | 206~213 | 18.1 | 1.96 | 168~177 | 3.13 | 28.3 | 94.5 |
| 1-4 | 0.100 | 0.170 | 235~236 | 2.66 | 210~213 | 39.0 | 2.30 | 163~177 | 2.08 | 25.6 | 82.4 |
| 1-5 | 0.150 | 0.215 | 243~245 | 3.35 | 204~213 | 76.4 | 3.55 | 158~162 | 3.16 | 22.5 | 80.3 |
| 1-6 | 0.200 | 0.249 | 244~246 | 4.96 | 203~209 | 349 | 10.0 | 152~155 | 2.72 | 16.2 | 79.9 |

M.P.=Melting point.

In Table 1, $f_2$ is the mole fraction of acrylic acid in the fed-in monomer and $F_2$ is the mole fraction of acrylic acid contained in the copolymer. The crystalline melting point was measured through a pair of crossed polar-

EXAMPLE 4

0.5 g of the copolymer salt obtained in Example 1 ($F_2$-0.159, m.p. 198° - 204°C) was placed in a steel bomb followed by adding 100 ml of ethylene oxide in a nitrogen atmosphere. The mixture was reacted at 40° – 60°C with stirring for 16 hrs. Ethylene oxide was then driven off by evaporation and the graft polymer was dissolved in N,N-dimethylformamide. The solution was placed on a glass plate and it was kept at 80° – 100°C in a vacuum of 5 – 10 mm Hg for two hrs., thus forming a film of 50 $\mu$ in thickness. The film had the volume inherent electric resistivity of $10^{11} - 10^{13}$ Ω/cm, which almost equals that of cellophane.

EXAMPLE 5

1 mole of a mixture of acrylonitrile and acrylic acid, 300 ml of N,N-dimethylformamide and 0.5 g of $\alpha,\alpha'$-azobisisobutyronitrile were sealed in a nitrogen atmosphere in an ampoule which was maintained at 50°C for 20 hrs. The contents poured into were vigorously agitated 3 l of water in a high-speed mixer yielding white powder which was washed with methanol, filtered and dried in vacuo.

20 g of the copolymer and 500 ml of n-butylamine were sealed in an ampoule in a nitrogen atmosphere and kept standing at 30°C for 20 hrs. The free n-butylamine was washed off by n-hexane and the copolymer salt was dried in vacuo.

20 g of the copolymer salt and 50 ml of $\beta$-propiolactone were sealed in a nitrogen atmosphere in an ampoule which was maintained at 30°C for 20 hrs. The content was then poured into 5 l of vigorously agitated of chloroform in a high-speed mixer to form a powder. The powder was washed with chloroform, filtered and dried in vacuo. The properties of the polymers are given in Table 4.

The relative crystallinity and crystallite size of the graft polymer are typically smaller than those of the copolymer and copolymer salt. The electrical resistivity of the graft polymer was smaller, too, than that of the copolymer and copolymer salt.

EXAMPLE 6

7.21 g of acrylic acid and 0.05 g of $\alpha,\alpha'$-azobisisobutyronitrile were sealed in an ampoule in a nitrogen atmosphere and kept standing at 50°C for two hrs. The resulting polyacrylic acid was mixed with 50 ml of isopropylamine and the mixture was then maintained at 50°C for one hr. The contents were then poured into 400 ml of vigorously agitated n-hexane in a high-speed mixer. The polymer salt was washed with n-hexane and dried in vacuo. To the dry polymer salt were added 50 ml of $\beta$-propiolactone, and the mixture was left standing at 30°C for 15 hrs. The resulting graft polymer solution was poured into 400 ml of water, thereby forming a gum which was insoluble in water. The dried gum of the graft polymer had the same appearance as that of polyvinylacetate. The graft polymer has no sour taste and may be used as a material for chewing gum and adhesive.

EXAMPLE 7

0.9 mole of acrylonitrile was copolymerized with 0.1 mole of methacrylic acid in 300 ml of dimethylsulfoxide with $\alpha,\alpha'$-azobisisobutyronitrile as catalyst and keeping the mixture at 50°C for 40 hrs. in a nitrogen atmosphere in a sealed ampoule. The resulting copolymer solution was wet spun by passing it through a mixture of dimethylsulfoxide and water, thereby forming a fiber which was passed through water and then through a drier. Then the fiber was passed through dimethylamine at a temperature of 70°C for one min. and dried at

TABLE 4

| Experimental data number | Copolymer | | | | | | Copolymer salt | | | | | Graft polymer | | | | |
|---|---|---|---|---|---|---|---|---|---|---|---|---|---|---|---|---|
| | $f_2$ | $F_2$ | M.P. | [η] | Relative crystallinity | Relative crystallite size | M.P. | [η] | Relative crystallinity | Relative crystallite size | Graft ratio | Graft chain length | M.P. | [η] | Relative crystallinity | Relative crystallite size |
| 5-1 | 0.0100 | 0.0122 | 228~234 | 0.700 | 42.0 | 121 | 204~216 | 0.755 | 40.0 | 107 | 1.19 | 97.1 | 198~206 | 0.762 | 35.6 | 84.6 |
| 5-2 | 0.0300 | 0.0582 | 220~231 | 0.748 | 41.5 | 115 | 204~216 | 0.712 | 37.5 | 100 | 17.9 | 3.07 | 195~204 | 0.749 | 32.2 | 80.4 |
| 5-3 | 0.0500 | 0.128 | 219~226 | 0.779 | 41.0 | 100 | 198~214 | 0.690 | 35.0 | 89.3 | 34.0 | 2.65 | 184~193 | 0.740 | 26.0 | 76.6 |
| 5-4 | 0.100 | 0.163 | 222~239 | 0.742 | 38.2 | 100 | 197~209 | 0.786 | 30.4 | 89.0 | 46.2 | 2.85 | 190~200 | 0.648 | 15.3 | 76.6 |
| 5-5 | 0.150 | 0.266 | 223~238 | 0.872 | 36.8 | 94.5 | 197~208 | 0.720 | 28.7 | 80.4 | 65.6 | 2.47 | 140~164 | 0.582 | 10.8 | 76.0 |
| 5-6 | 0.200 | 0.333 | 220~236 | 0.862 | 36.3 | 76.6 | 191~206 | 0.695 | 23.6 | 59.5 | 88.7 | 2.67 | (¹) | 0.543 | 0.0 | 70.0 |

¹ Amorphous.

50°C by passing once more through a drier. The fiber was then passed through a solution of β-propiolactone dissolved in acetonitrile at 50°C for five minutes, and after that through chloroform at 300°C. Finally, the fiber was dried by passing through a drier at 50°C, whereby the fiber of the graft polymer was obtained. This fiber had a volume inherent resistivity of $10^{10}$ Ω/cm at 30°C, which is far smaller than that of polyacrylonitrile ($10^{15+16}$ Ω/cm).

EXAMPLE 8

46.8 g of styrene was copolymerized with 7.2 g of acrylic acid with benzoyl peroxide as initiator in a nitrogen atmosphere in a sealed ampoule at 50°C for three days. The resulting copolymer was dissolved in 450 ml of chloroform and the solution was poured into 4.5 l of vigorously agitated methanol in a high-speed mixer to form a precipitate. The resulting copolymer was washed with methanol and dried in vacuo.

Treatment of the copolymer with n-butylamine and washing with ether gave a copolymer salt.

20 g of the copolymer salt and 200 g of ethylene oxide were placed in a steel bomb in a nitrogen atmosphere and were reacted at 80°C with stirring for 30 hrs. After the reaction was completed, excess ethylene oxide was drawn off by evaporation. The graft polymer was dissolved in benzene and the solution was placed on a glass plate and heated at 60°–70°C in vacuo at 5–10 mm Hg for four hrs. to form a film. This film was colorless and transparent and showed a low electrostatic charge when taken off the plate.

EXAMPLE 9

In an ampoule, which had been cooled with a dry ice and acetone mixture, 46 g of vinyl chloride, 4 g of methacrylic acid and 0.15 g of benzoyl peroxide were sealed in a nitrogen atmosphere and maintained at 50°C for 30 hrs. The resulting copolymer was dissolved in cyclohexanone and the solution was poured into water, filtered and dried in vacuo.

20 g of the copolymer and 300 ml of ethylamine were placed in an ampoule in nitrogen and kept standing at 10°C for five hrs. The free ethylamine was washed out with n-heptane, and the copolymer salt was dried in vacuo.

20 g of the copolymer salt and 300 ml of ε-caprolactone were sealed in an ampoule in a nitrogen atmosphere and kept standing at 50°C for 15 hrs. The contents were then poured into 500 ml of vigorously agitated water in a high-speed mixer to form the powder of a graft polymer.

This graft polymer had a strength of 10,000 – 20,000 psi and was capable of forming film at 120° – 160°C. The resulting film had good dyeability and a low electrostatic charge.

EXAMPLE 10

To 2.5 g of the copolymer of acrylonitrile with acrylic acid ($F_2$=0.126, m.p. 224° – 238°C) obtained by the same method as described in Example 5, 100 ml of 1 N aqueous sodium hydroxide was added. The mixture was kept standing at 30°C for 20 min. The resulting copolymer salt was washed with water in a high-speed mixer, filtered and dried in vacuo.

2.5 g of the copolymer salt and 50 ml of ε-caprolactone were reacted in a nitrogen atmosphere in a sealed ampoule at 30°C for 15 hrs. The contents were then poured into 500 ml of vigorously agitated chloroform to form the powder of a graft polymer.

The powder was washed with chloroform, filtered and dried in vacuo whereby a dried graft polymer having the melting point of 100°–140°C was formed.

The film obtained from this graft polymer showed a low electrostatic charge when taken off the glass plate.

EXAMPLE 11

2 g of the copolymer salt obtained by experimental data No. 1–4 of Example 1, 20 ml of β-propiolactone and 20 ml of ε-caprolactone were sealed in a nitrogen atmosphere in an ampoule which was kept standing at 30°C for 20 hrs. The contents were then dissolved in 40 ml of N,N-dimethylformamide and the solution poured into 400 ml of vigorously agitated water whereby a precipitate was formed. The precipitate was washed with methanol, filtered and dried in vacuo. The graft polymer was found to have the ring-opened units of β-propiolactone and ε-caprolactone. The graft polymer had the melting point of 160°–169°C and showed a lower electrostatic charge than did polyacrylonitrile.

EXAMPLE 12

1 g of the copolymer salt obtained in Example 8, 10 ml of ε-caprolactone and 10 ml of ethylene oxide were sealed in an –in a nitrogen atmosphere and kept standing at 40°1   60°C for 48 hrs.

The contents were then dissolved in 10 ml of benzene. The solution was filtered to remove a small amount of insoluble impurity. Th filtrate was poured into 100 ml of vigorously agitated methanol to form a precipitate which was filtered and dried in vacuo.

The resulting graft polymer had the ring-opened units of ε-caprolactone and ethylene oxide. The graft polymer became soft at 92°–118°C, had good dyeability and showed little electrostatic charge.

This invention described above brings about the following improvements:

1. The resulting graft polymers are in many cases colorless and have good dyeability.
2. The graft polymers do not contain the crystallites consisting of the ring-opened units of β-propiolactone, ε-caprolactone or ethylene oxide, but are formed only by amorphous components, whereby the tendency to electrostatic charge, crystallinity, crystalline melting and softening points are decreased while the plasticity and dyeability are increased. For example, a graft polymer of polyvinyl chloride is capable of forming films without the addition of any plasticizer, and the films have good dyeability and low electrostatic charge.
3. Graft polymers with low to high graft ratios can be obtained, depending on the desired properties; graft polymers with high graft ratios may be prepared as materials for adhesives, gums and paints, while graft polymers with low graft ratios may be used as materials for fibers, plastics and films. Thus the graft polymers of this invention lend themselves to a great variety of purposes.
4. The graft polymerization can be performed under mild conditions so that the preparation of the desired products becomes simpler and less expensive.

What is claimed is:

1. A process for preparing graft polymers which comprises:
   a. forming a polymer salt by neutralizing a homopolymer or copolymer consisting of vinyl units containing carboxylic acid groups with at least an equimolar amount of a base, based on the carboxylic acid groups;

b. separating any excess of said base from the polymer salt; and c. reacting the separated polymer salt with beta-propiolactone or epsilon-caprolactone in the absence of any of said base.

2. The process according to claim 1, wherein the reaction of said vinyl polymers with said cyclic compounds is carried out in an inert atmosphere at a temperature above the melting point of the cyclic monomer used and below 160°C.

3. The process according to claim 2, wherein the reaction temperature in the case of $\epsilon$-caprolactone is between 40° and 100°C.

4. The process according to claim 2, wherein the reaction temperature in the case of $\beta$-propiolactone is between 0° - 80°C.

5. The process according to claim 1, wherein the reaction with said cyclic monomers is carried out in a solvent which is substantially inert with respect to the cyclic monomer.

6. The process according to claim 1, wherein the vinyl copolymer is composed of units expressed in the formula

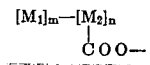

wherein $M_1$ is selected from the group consisting of acrylonitrile, methacrylonitrile, acrylamide, methacrylamide, styrene, vinylacetate, vinylidine cyanide, butadiene, vinylchloride, vinylidine chloride, methyl acrylate, and methyl methacrylate; $M_2$—COO— is selected from the group consisting of acrylate ion, methacrylate ion, crotonate ion, maleate ion, aconitate ion, itaconate ion, and $\alpha$-oleostearate ion, including those derived from their anhydrides, acid chlorides and their esters; m represents the total units of the vinyl monomer $M_1$ contained in the copolymer; and n represents the total units of the monomer $M_2$—COO— contained in the copolymer wherein $0 < n/(m+n) \leq 1$, $n \neq 0$, $n/(m+n)$ being the mole fraction of the monomer $M_2$—COO— contained in the copolymer.

* * * * *